United States Patent [19]
Oberle

[11] Patent Number: 6,146,046
[45] Date of Patent: Nov. 14, 2000

[54] MULTIDIRECTIONAL CONNECTING DEVICE

[75] Inventor: Jean-Marc Oberle, Cosswiller, France

[73] Assignee: Steelcase Strafor, Strasbourg, France

[21] Appl. No.: 08/930,417

[22] PCT Filed: Jan. 22, 1997

[86] PCT No.: PCT/FR97/00122

§ 371 Date: Dec. 16, 1997

§ 102(e) Date: Dec. 16, 1997

[87] PCT Pub. No.: WO97/26807

PCT Pub. Date: Jul. 31, 1997

[30] Foreign Application Priority Data

Jan. 23, 1996 [EP] European Pat. Off. .............. 96440008

[51] Int. Cl.[7] .................................................. A47B 81/00
[52] U.S. Cl. .................. 403/170; 403/170; 403/403; 312/223.3; 312/223.6; 108/50.02
[58] Field of Search ..................... 403/169, 170, 403/174, 178, 217, 231, 403; 312/265.1, 265.4, 223.6, 223.3, 196; 108/50.02, 155, 158, 156

[56] References Cited

U.S. PATENT DOCUMENTS 2,624,083  1/1953  Butler et al. ............................ 403/217
2,852,221  9/1958  Steiner .................................... 248/188
2,909,867  10/1959  Hobson ................................... 403/174
3,443,530  5/1969  Carlson ................................... 108/156
5,020,866  6/1991  McIlwraith ........................... 312/265.4
5,425,520  6/1995  Masumoto .......................... 403/170 X
5,605,410  2/1997  Pantev ................................. 403/174 X
5,934,203  8/1999  Glass ...................................... 108/156

FOREIGN PATENT DOCUMENTS 60959  2/1955  France ................................... 403/174
217285  1/1985  Germany .............................. 403/170

*Primary Examiner*—Lynne H. Browne
*Assistant Examiner*—David E. Bochna
*Attorney, Agent, or Firm*—Abelman, Frayne & Schwab

[57] ABSTRACT

A multidirectional connecting device for assembling and mutually securing furniture parts, e.g., for modular landscaped offices essentially consisting of horizontal work surfaces, underframes and vertical panels or elements arrangeable in a plurality of configurations. The device comprises a central portion (1) with at least one horizontal planar surface located underneath at least one work surface (13), said central portion (1) being provided with vertical surfaces to which are connected projections (2, 3) engaging other supporting elements of the work surface (13), as well as at least one arm (4) that ends in a raised portion (7) for supporting at least one vertical element (14). Said device is adjacent to a corner of the work surface (13).

16 Claims, 5 Drawing Sheets

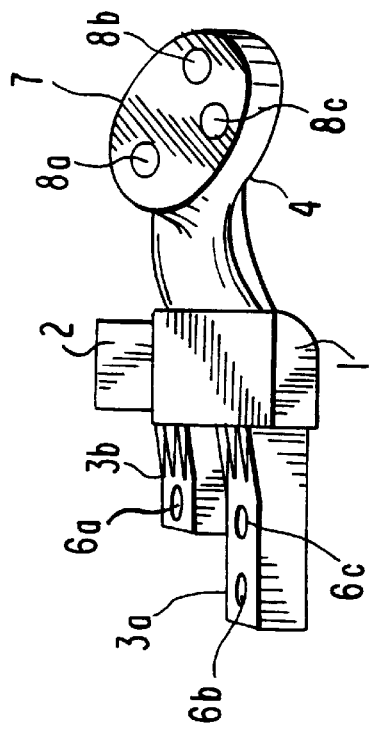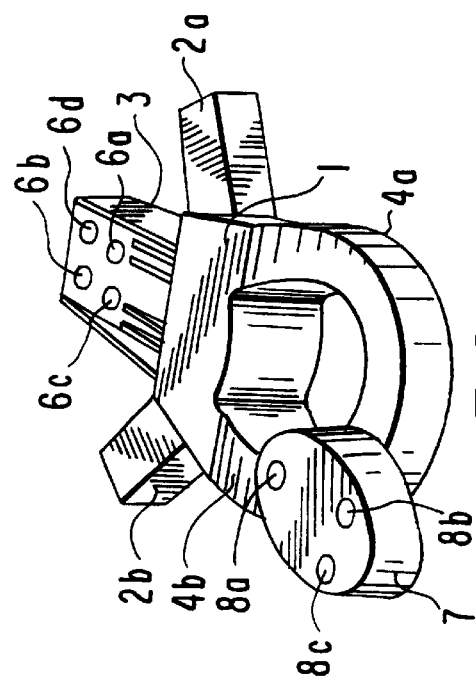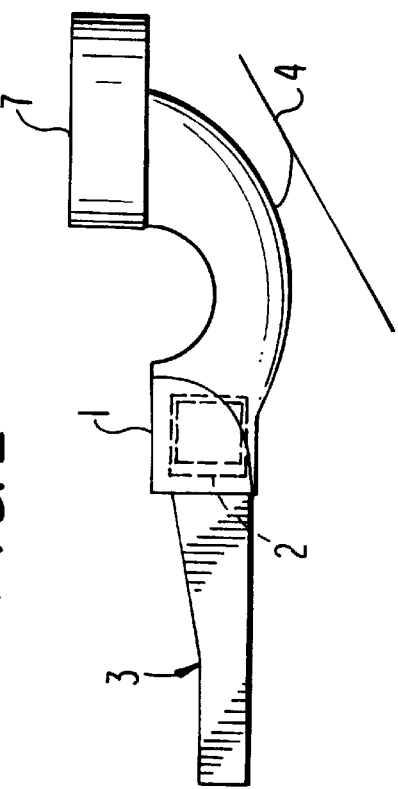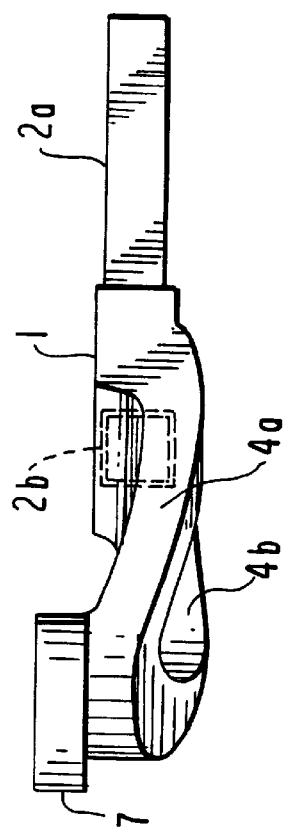

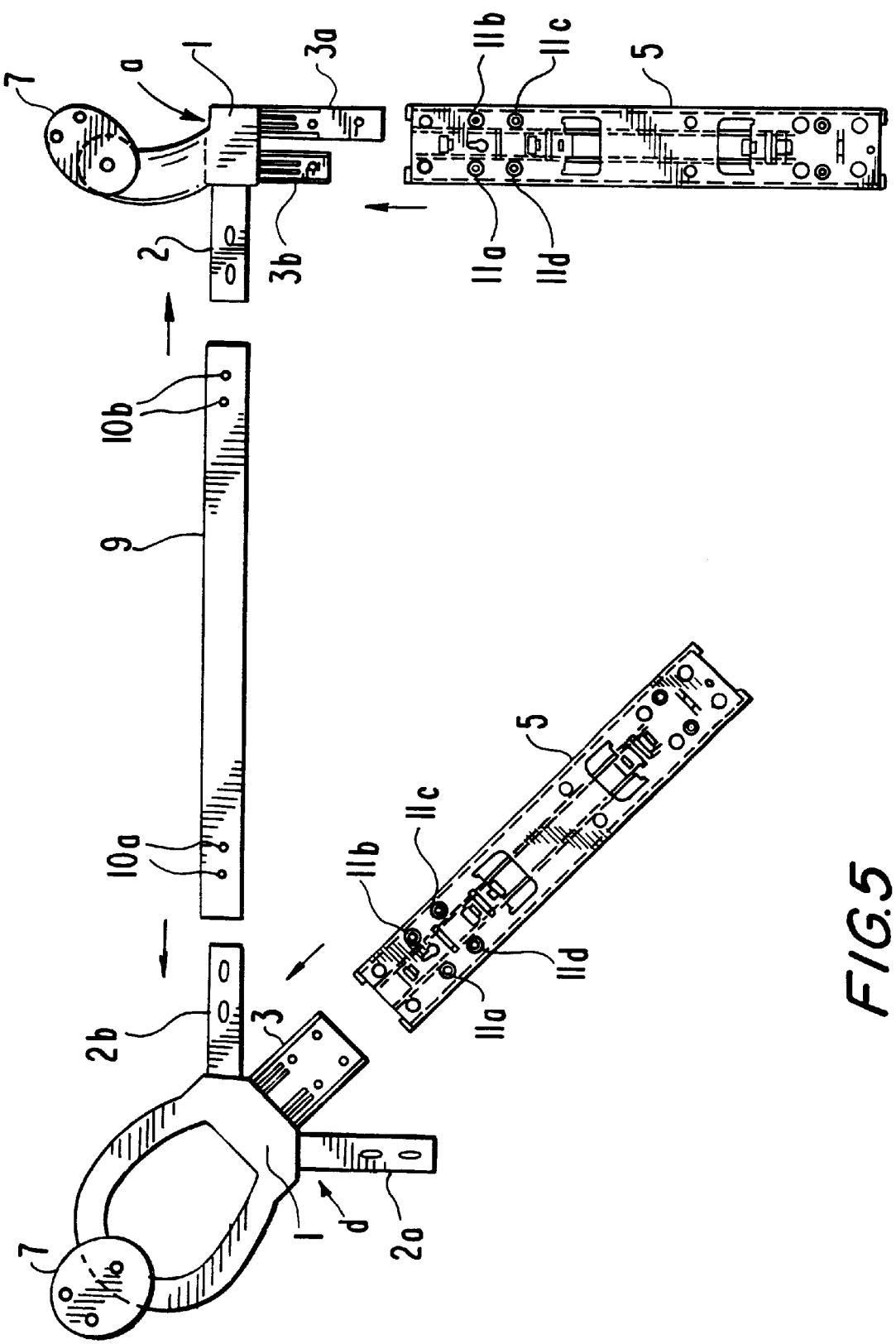

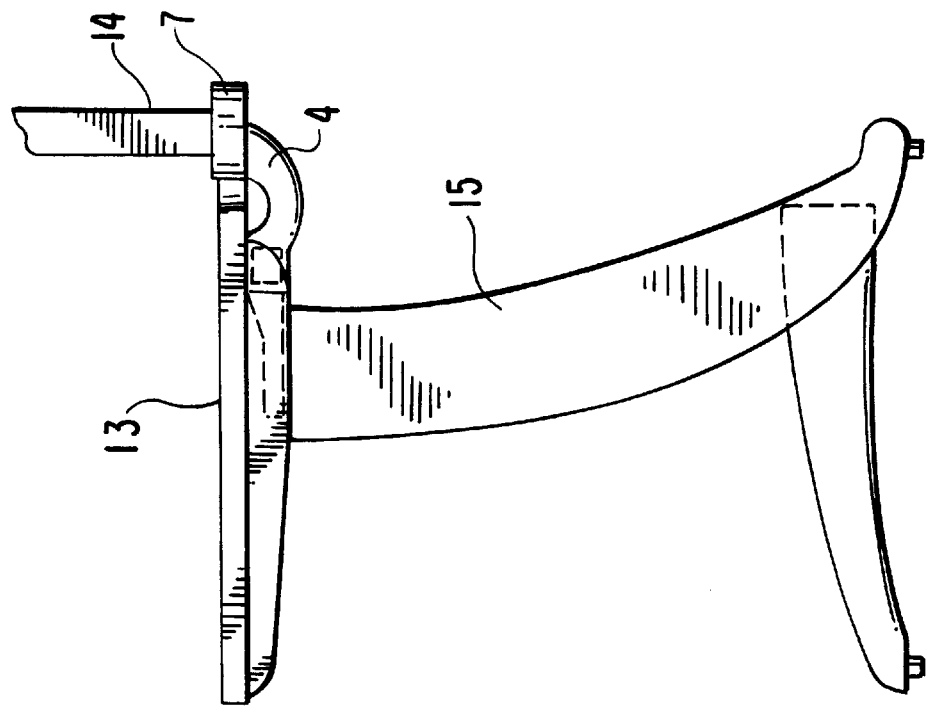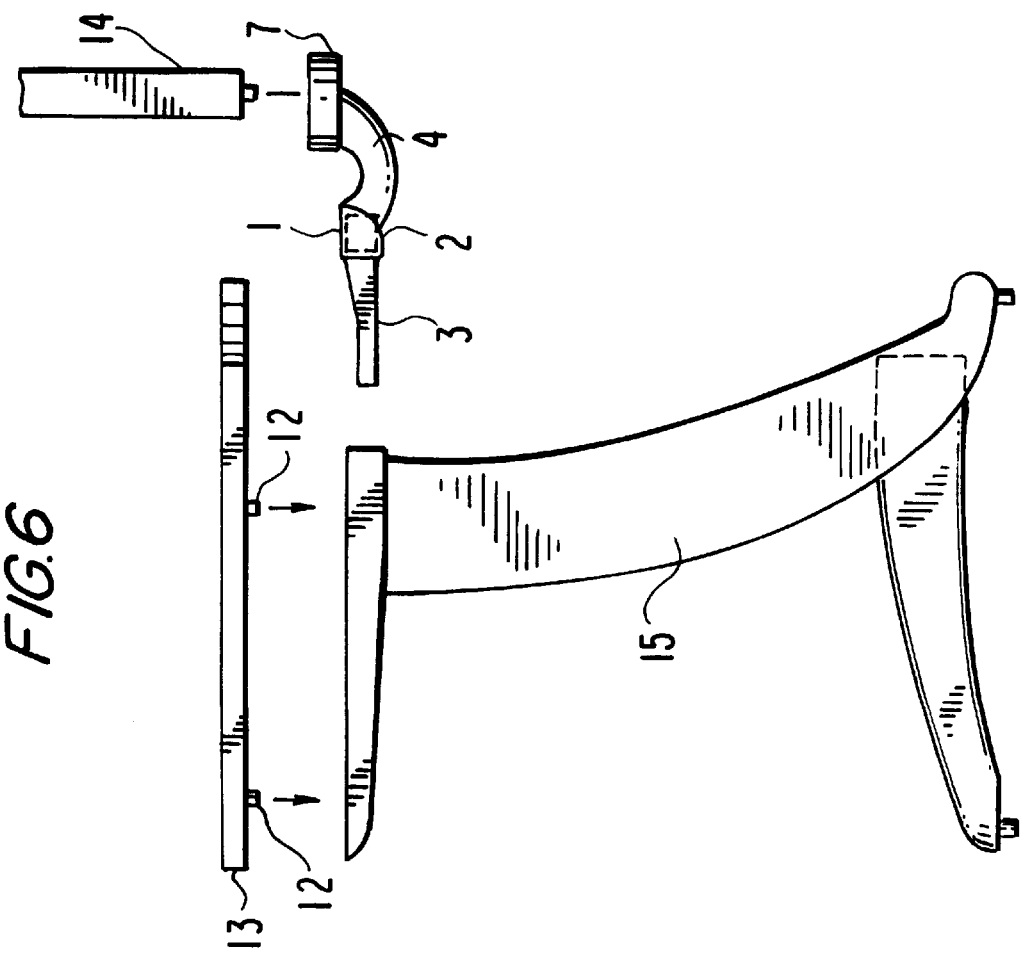

MULTIDIRECTIONAL CONNECTING DEVICE

BACKGROUND OF THE INVENTION

The present invention concerns a multidirectional connecting device for assembling and interlocking pieces of furniture of the type used in open-plan offices, consisting substantially of horizontal working surfaces, sub-frames and panels or vertical components which can be fitted together according to multiple combinations giving varied office configurations.

One of the difficulties of producing assemblies known as "open plan" lies in the large number of components to be assembled, leading to multiple solutions covering assembly and fastening which can complicate the task of operators responsible for assembly. Upstream from the actual assembly operations, control over fastening systems also constitutes a considerable problem, depending mostly on the configuration to be achieved.

Recently, the tendency has been to reduce the number of modules offered in the said open-plan assemblies, so as to simplify ordering and the processing of orders. Problems encountered by installers in assembling the said modules, where connections in several directions are involved, have not however always been simplified by this. It is still necessary to deal with horizontal connections in several planes, which differ according to the modules to be connected, and vertical connections which also depend on the type of module to be installed, of which the methods of fastening are not always well differentiated, and which can be the origin of errors, or at the very least can complicate control over the assembly.

These problems are in particular generated by the usual designs of modules for open-plan offices, configured in the form of complete blocks which can be kept separate or joined, and comprising at least one horizontal panel and sub-frames, to which are optionally added vertical components of the separating panel type. In conventional assemblies, these panels are moreover fixed directly to the working surface of the said horizontal panel.

This type of traditional design, which increases the number of zones to be fastened, sometimes results in structurally redundant components, stands in the way of a clear and simplified view of the assembly to be obtained, and finally does not enable the best use to be made of the available spaces and areas.

Thus, the system disclosed in the French patent document reference FR-A-2 192 784 has many parts which make it possible, according to the options used, to end up with several assembly configurations. It is for example possible to obtain C-, U- and I-shaped sub-frames by means of particular arrangements and a specific choice from among the various components forming parts of the system.

In this example, there are typically a number of different components which are incompatible with a simplified organization of stocks and assembly, and the organization of the assembly itself suffers from a lack of unity, at least for certain of the basic parts. Each assembly calls for an excellent knowledge by the fitter of the parts at his disposal, and excellent stock management upstream. In addition, the fitter must have specific tools available and must make no mistakes in the order of assembly.

The present invention overcomes these disadvantages by using a part which ensures several functions in relation to the open-plan assembly modules with which it cooperates, including mainly but not exclusively the functions of interlocking the said modules.

The first objective of the part or device of the invention is consequently the interlocking/fastening of modules to each other in several directions corresponding substantially to the planes in which the said modules are arranged.

Another objective of the invention is to provide a connecting device of this type which can cooperate with a sub-frame arranged either under the edge of a single horizontal panel, or shared between two contiguous panels, the said device being nevertheless positioned in the two cases in the same manner relative to the horizontal panel.

Yet another objective of the invention is to enable vertical components of the separating partition type to be positioned and fastened, so as to avoid any direct connection between the working surface of the said panels and the vertical components.

Secondly, the device of the invention also enables a section to be attached which connects two connecting devices according to the invention, extending in a longitudinal direction relative to the panel forming the working surface, and forming a stabilizer for the assembly.

This connecting device has therefore several definite advantages within the context of assembling components of open-plan furniture, by simplifying their assembly, improving their modularity, in particular by making it possible to share the sub-frame, and finally by enabling heavy vertical components to be installed under mechanical stress. The latter components are for example storage cabinets overhanging the working surface, or shelves.

BRIEF SUMMARY OF THE INVENTION

To this end, the multidirectional connecting device according to the invention includes a central plate provided with vertical faces from which extend firstly pegs designed to cooperate with other components supporting the panel, and secondly at least one arm ending in a raised plate designed to support at least one vertical component, the said device being situated in the vicinity of an angle of a working surface.

One of the pegs takes the form of a beam with a rectangular appearance designed to cooperate with a section fitting into the said beam. This is in fact the aforementioned section, acting in particular as a stabilizer. According to a preferred configuration, the said section may be fastened to the said beam with the aid of a fastener enabling the relative positions of the two components to be adjusted.

This fastener includes for example at least one screw which can be screwed into an orifice in the beam after having passed through an orifice in the section, it being possible for one or other of the said orifices to be elongated so as to enable the relative positions to be adjusted before fastening.

One of the pegs extending from the central plate of the multidirectional connecting component according to the invention is double, it being possible for each of its two branches to cooperate with an identical section, into which it is inserted.

The section in question is for example situated at the upper part of a sub-frame supporting a horizontal panel, forming the supporting bracket on which the said panel rests.

The two branches may be of different lengths and may be provided with orifices designed to cooperate with the means of fastening the horizontal panel to be fastened.

One of the branches, or two together, fit into the said section which supports a horizontal panel provided with at least one fastening stud cooperating simultaneously with the said section and the orifices in the branch or branches.

The third component connected to the central plate, namely the arm ending in a raised plate, is arranged so that the upper surface of the said plate is substantially level with the upper surface of the working surfaces.

The said upper surface of the plate is provided with raised portions and more particularly orifices permitting the installation of vertical components of the vertical panel or small column type, supporting storage devices.

According to one possibility, the arm ending in the raised plate is double and is deployed symmetrically either side of a vertical middle plane.

Also preferably, each arm connecting the raised plate to the central plate has a curved shape.

As stated previously, the advantages obtained by this multidirectional connecting piece are considerable, since it concentrates functions hitherto distributed among the different components to be assembled and it simplifies assembly operations.

The invention will be described in a more detailed manner, with reference to the accompanying figures, in which:

BRIEF DESCRIPTION OF THE SEVERAL VIEWS OF THE DRAWINGS

FIG. 1 is a perspective view of a connecting device according to the present invention;

FIG. 2 is a view in elevation of the face of the same device;

FIG. 3 is a perspective view of a diagonal variant of the angled device shown in FIGS. 1 and 2;

FIG. 4 is a view in elevation of the device of FIG. 3;

FIG. 5 shows an application of two variants of the preceding figures;

FIG. 6 represents a side view of a complete assembly using an angled device, during assembly;

FIG. 7 represents the same view, with the assembly complete;

The various figures defined above represent a preferred configuration of the invention, comprising principally a central plate 1 from which the stubs 2 and 3 and an arm 4 extend.

DETAILED DESCRIPTION OF THE INVENTION

Figure 8:
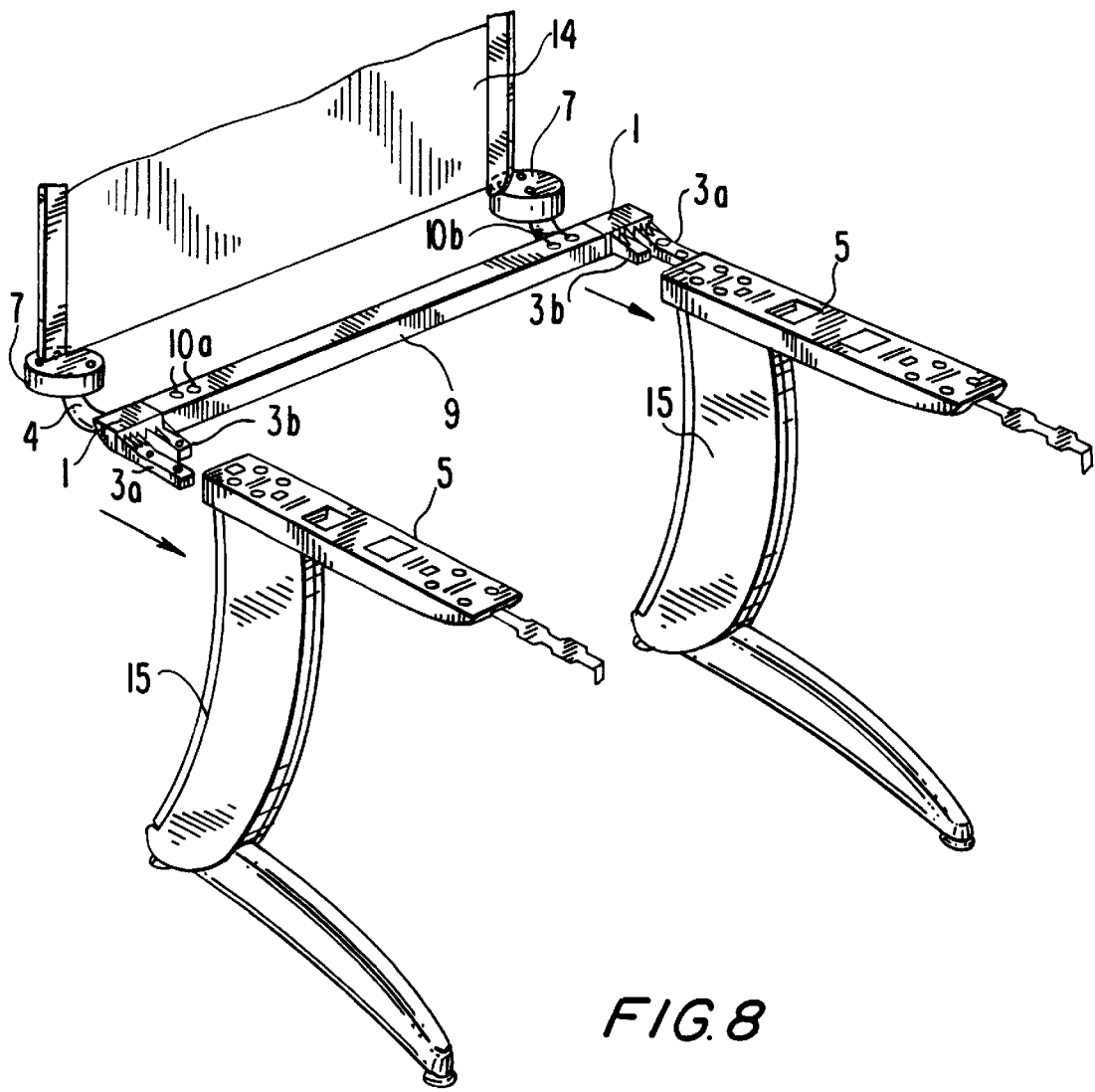
FIG. 8 gives a perspective view of this.

The central plate 1, together with the pegs 2 and 3, have a prismatic appearance. The angled version of the device, represented in FIGS. 1 and 2, has a double peg 3a and 3b designed to cooperate with the upper supporting bracket 5 of a sub-frame (FIGS. 5, 8). The orifices 6a, 6b, 6c made in the said pegs 3a and 3b are provided so as to cooperate with the studs of the horizontal panel forming the working surface, as will be described in detail below. There are two different angled versions, a right-handed version and a left-handed version.

The plate 7, raised with respect to the components just described, ends in a curved arm 4, enabling on the one hand the vertical components to be offset with respect to the working surface, and on the other hand allowing the passage of electric cables which are simply positioned. In this way, even when the horizontal panel partially surrounds the plate 7, cables can pass between the said panel and the arm 4 since a passage exists due to the curvature. This plate 7 also possesses orifices 8a, 8b, 8c designed to receive the said vertical components of the small column or panel type etc (see FIG. 8), held firmly in place for example by a conical coupling.

FIGS. 3 and 4 show an alternative to the angled version, designed to equip diagonal supporting zones. This diagonal version comprises a single peg 3, but has a double arm 4a, 4b and a double peg 2a, 2b designed to lock two perpendicular sections together.

The reason for only having one peg 3 is explained by the fact that in such a diagonal zone the said peg only cooperates with one supporting bracket 5 surmounting a single sub-frame. On the other hand, as will be seen below, the double peg 3a, 3b permits cooperation with a "half" supporting bracket 5, shared longitudinally with another multidirectional connecting device according to the present invention.

FIG. 5 shows more clearly the articulation of the various components of the assembly: this view from above shows the upper parts of the sub-frames, namely the supporting brackets 5, giving moreover the directions of the said sub-frames. An angled device according to the invention and a diagonal device d enclose a section 9 provided with orifices 10a, 10b cooperating with the oblong orifices of the pegs 2, 2b so that a positional adjustment can be made when the section 9 is attached to the said pegs 2, 2b. This attachment may be made with the aid of a simple bolted joint.

The supporting brackets 5 are such that when butted up against the corresponding vertical face of the plate 1 of the connecting device of the invention, their end orifices 11a to 11d are centred with the orifices 6a to 6c or 6d of the said device. Studs 12 (see FIG. 6), placed under the horizontal panels 13, lodge in the orifices thus created, and may be fastened by means of an internal locking device to the supporting bracket, a device which is not the subject of the present invention.

FIGS. 6 and 7 show the assembly of the upper components, namely the panel 13 and a vertical partition 14, the plate being centred/fastened via the studs 12. The white arrows, in all the figures in which they appear, show the direction of assembly.

When the assembly is mounted on the sub-frames 15, the panel 13 and the raised plates 7 of the connecting devices of the present invention are substantially on the same level. The vertical partitions 14 consequently reach down to the level of the upper surface of the said panels 13. The latter rest on the central plates 1 of the connecting devices of the invention, on the sections 9 fitted onto the pegs 2, and on the supporting brackets 5 of the sub-frames.

Figure 9:
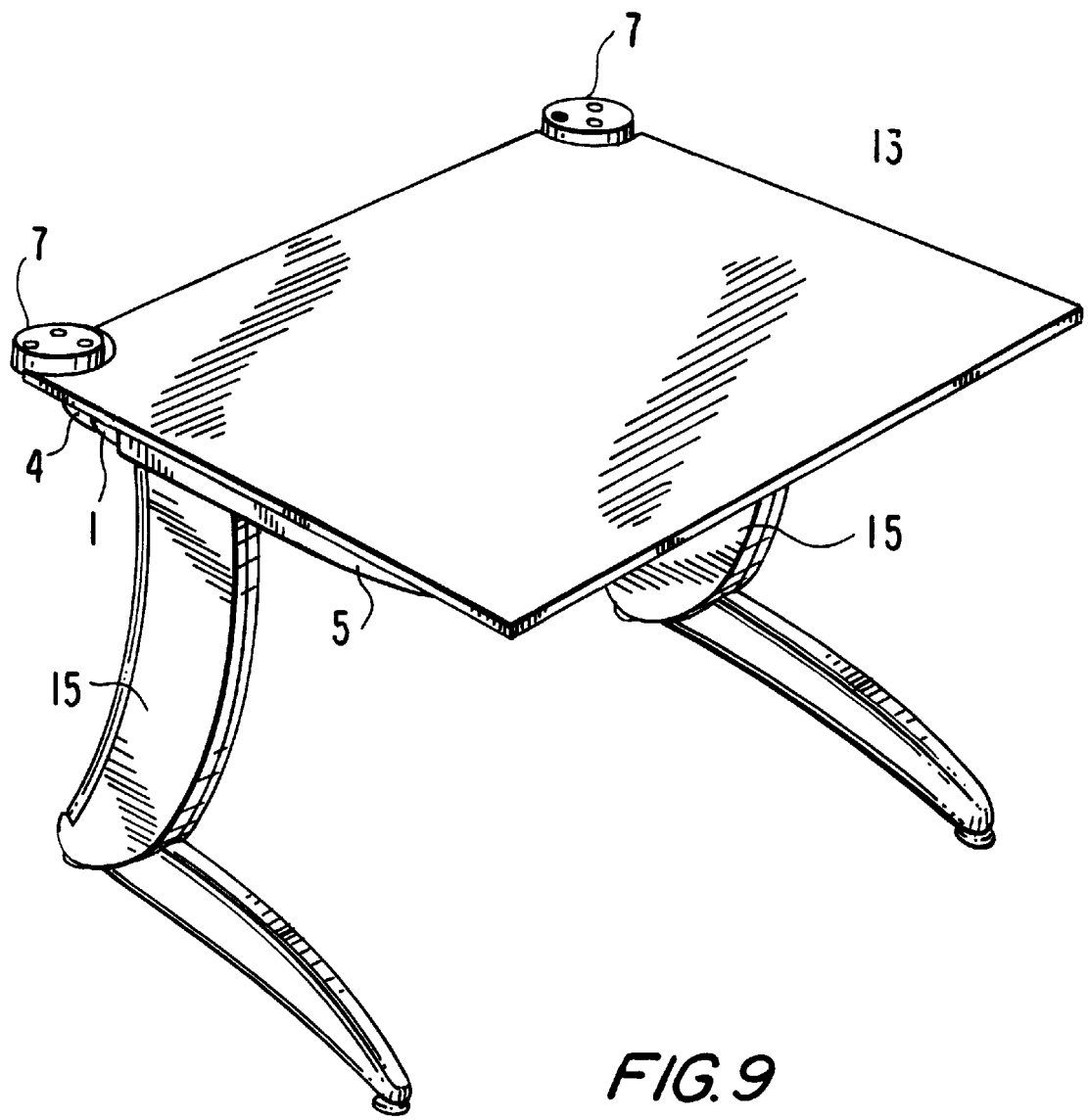
FIG. 9 shows this same view with a horizontal panel and without a vertical partition.

FIG. 8 shows, in perspective, a phase in the installation giving the respective positions of the aforementioned components. Only the horizontal panel 13 is missing, which is not shown so that the components more directly associated with the subject of the invention can be more easily seen. It is however present in FIG. 9, also revealing the flush nature of the plate 7, partially surrounded by the said panel 13.

It should be noted that the angled devices have of course two different configurations, which are symmetrical relative to a vertical plane perpendicular to the section 9.

FIG. 8 clearly shows the considerable advantage procured by the invention as regards the interlocking of the various components. In point of fact, each device of the invention possesses a certain number of possible connections, which are easy to take into account when the open-plan office is designed, and uses means which are easy to put into practice, such as plugging in pegs, assembly by gravity under stress etc.

All the preceding description also clearly shows the modularity permitted by the device, enabling sub-frames to be shared between two panels, vertical panels to be used in several possible directions etc.

However, this description only aims to present a preferred example of the multidirectional connecting device according to the invention. Indeed it cannot be considered as limiting the invention, and covers in particular variants included within the scope of the protection afforded by the accompanying claims.

What is claimed is:

1. A multidirectional connecting device for assembling and interlocking pieces of furniture of the type used in modulable open-plan offices, which includes horizontal working surfaces, sub-frames and panels or vertical components adapted to be fitted together according to multiple configurations, comprising a central plate having at least one horizontal flat surface situated under at least one working surface of a horizontal panel, said central plate being provided with vertical faces, a pair of pegs extending from one vertical face, the device being situated in the vicinity of an angle of the at least one working surface wherein one of said pegs is in the form of a beam having a prismatic configuration for cooperating with a section fitting into said beam and the other of said pegs being adapted to cooperate with other supporting components of the at least one working surface, and at least one arm extending from the other vertical face of said central plate and ending in a raised plate designed to support at least one vertical component.

2. The multidirectional connecting device according to claim 1 wherein the said section can be attached to said beam via an attachment means which enables the relative position of the two components to be adjusted.

3. The multidirectional connecting device according to claim 2 wherein said attachment means comprises at least one screw which can be screwed into an orifice in the beam, the configuration of said orifice being oblong to enable the relative position of the pieces of furniture and said beam to be adjusted before attachment.

4. The multidirectional connecting device according to claim 3, wherein one of the pegs is divided into two branches, each of the two branches adapted to cooperate with an identical shaped section into which each branch can be inserted.

5. The multidirectional connecting device according to claim 4, wherein the two branches differ in length and are provided with orifices adapted to cooperate with the means of attachment of the horizontal panel which is to be attached.

6. The multidirectional connecting device according to claim 1 wherein one of the pegs is divided into two branches, each of the two branches adapted to cooperate with an identical shaped section into which each branch can be inserted.

7. The multidirectional connecting device according to claim 6, wherein the two branches differ in length and are provided with orifices adapted to cooperate with the attachment means of the horizontal panel which is to be attached.

8. The multidirectional connecting device according to claim 1, wherein the arm ending in the raised plate is arranged so that an upper horizontal surface of said plate is substantially level with the upper surface of the horizontal panel.

9. The multidirectional connecting device according to claim 8, wherein each arm connecting the raised plate to the central plate has a curved shape, extending below the level of the horizontal flat surface of the central plate, except by the end of said arm leading to the raised plate.

10. The multidirectional connecting device according to claim 8, wherein said arm ending in the raised plate is divided into two branches and is deployed symmetrically on either side of a middle vertical plane.

11. The multidirectional connecting device according to claim 10, wherein each arm connecting the raised plate to the central plate has a curved shape, extending below the level of the horizontal flat surface of the central plate, except by the end of said arm leading to the raised plate.

12. The multidirectional connecting device according to claim 8, wherein said upper surface of the plate is provided with embossed areas enabling vertical components of the vertical panel type or small columns to be installed.

13. The multidirectional connecting device according to claim 12, wherein said arm ending in the raised plate is divided into two branches and is deployed symmetrically on either side of a middle vertical plane.

14. The multidirectional connecting device according to claim 13, wherein each arm connecting the raised plate to the central plate has a curved shape, extending below the level of the horizontal flat surface of the central plate, except by the end of said arm leading to the raised plate.

15. The multidirectional connecting device according to claim 12, wherein each arm connecting the raised plate to the central plate has a curved shape, extending below the level of the horizontal flat surface of the central plate, except by the end of said arm leading to the raised plate.

16. The multidirectional connecting device according to claim 12 wherein the embossed areas comprise orifices.

* * * * *